United States Patent
Tylik et al.

(10) Patent No.: US 11,615,004 B2
(45) Date of Patent: Mar. 28, 2023

(54) SYSTEM AND METHOD FOR FAILURE HANDLING FOR VIRTUAL VOLUMES ACROSS MULTIPLE STORAGE SYSTEMS

(71) Applicant: EMC IP Holding Company, LLC, Hopkinton, MA (US)

(72) Inventors: Dmitry Tylik, Westborough, MA (US); Alexey Shusharin, Saint-Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 43 days.

(21) Appl. No.: 17/232,445

(22) Filed: Apr. 16, 2021

(65) Prior Publication Data
US 2022/0334931 A1  Oct. 20, 2022

(51) Int. Cl.
*G06F 11/20* (2006.01)
*G06F 13/16* (2006.01)
*G06F 3/06* (2006.01)

(52) U.S. Cl.
CPC ............ *G06F 11/201* (2013.01); *G06F 3/065* (2013.01); *G06F 3/0619* (2013.01); *G06F 3/0665* (2013.01); *G06F 3/0683* (2013.01); *G06F 13/1684* (2013.01); *G06F 2201/85* (2013.01)

(58) Field of Classification Search
CPC ...... G06F 11/201; G06F 3/0619; G06F 3/065; G06F 3/0665
See application file for complete search history.

(56) References Cited

U.S. PATENT DOCUMENTS

| | | | |
|---|---|---|---|
| 9,940,155 B1 * | 4/2018 | Lee | G06F 3/0683 |
| 9,983,896 B1 * | 5/2018 | Naik | G06F 3/061 |
| 2013/0054889 A1 * | 2/2013 | Vaghani | G06F 3/067 |
| | | | 711/E12.001 |

* cited by examiner

*Primary Examiner* — Nadeem Iqbal
(74) *Attorney, Agent, or Firm* — Brian J. Colandreo; Mark H. Whittenberger; Holland & Knight LLP

(57) ABSTRACT

A method, computer program product, and computing system for generating a pair of protocol endpoints within each storage system of a pair of storage systems. One protocol endpoint of the pair of protocol endpoints may be dedicated to each storage system of the pair of storage systems. One or more IO requests may be processed between one or more hosts and one or more virtual volumes within the pair of storage systems via the pair of protocol endpoints.

20 Claims, 6 Drawing Sheets

SYSTEM AND METHOD FOR FAILURE HANDLING FOR VIRTUAL VOLUMES ACROSS MULTIPLE STORAGE SYSTEMS

BACKGROUND

Storing and safeguarding electronic content may be beneficial in modern business and elsewhere. Accordingly, various methodologies may be employed to protect and distribute such electronic content.

Pairs of storage systems may be deployed in two different data centers or two server rooms within the same data center and may cooperate to expose a single "metro" virtual volume to application hosts, making those hosts and applications running on them perceive two virtual volumes hosted by the two storage systems as a single virtual volume. However, various types of failures may occur between storage systems (e.g., storage array failure, datacenter failure, network connectivity failure, etc.). Failure of network connectivity between storage systems presents unique challenges from a failure handling perspective, as both storage systems may be operational and can potentially provide host access to virtual volumes. However, not being able to replicate to the peer storage system, each virtual volume can only stay online on one storage system.

When interfacing with virtual volumes during these types of connection failures, conventional failure handling approaches are unable to manage paths for accessing virtual volumes bound to specific storage systems using common protocol endpoints.

SUMMARY OF DISCLOSURE

In one example implementation, a computer-implemented method executed on a computing device may include, but is not limited to, generating a pair of protocol endpoints within each storage system of a pair of storage systems. One protocol endpoint of the pair of protocol endpoints may be dedicated to each storage system of the pair of storage systems. One or more IO requests may be processed between one or more hosts and one or more virtual volumes within the pair of storage systems via the pair of protocol endpoints.

One or more of the following example features may be included. Generating the pair of protocol endpoints within each storage system of the pair of storage systems may include generating a pair of protocol endpoints for each host within each storage system of the pair of storage systems. The pair of storage systems may be synchronized storage systems configured to replicate the one or more virtual volumes on each storage system. Dedicating the one protocol endpoint of the pair of protocol endpoints to each storage system of the pair of storage systems may include assigning, for each virtual volume of the one or more virtual volumes, a storage system of the pair of storage systems for accessing the virtual volume during a connection failure between the pair of storage systems, thus defining a preferred storage system and a non-preferred storage system for each virtual volume. A connection failure between the pair of storage systems may be detected. In response to detecting the connection failure between the pair of storage systems, the one or more IO requests for the one or more virtual volumes may be processed via the protocol endpoint dedicated to the preferred storage system for each virtual volume. In response to detecting the connection failure between the pair of storage systems, access to the other protocol endpoint dedicated to the non-preferred storage system may be disabled for each virtual volume.

In another example implementation, a computer program product resides on a computer readable medium that has a plurality of instructions stored on it. When executed by a processor, the instructions cause the processor to perform operations that may include, but are not limited to, generating a pair of protocol endpoints within each storage system of a pair of storage systems. One protocol endpoint of the pair of protocol endpoints may be dedicated to each storage system of the pair of storage systems. One or more IO requests may be processed between one or more hosts and one or more virtual volumes within the pair of storage systems via the pair of protocol endpoints.

One or more of the following example features may be included. Generating the pair of protocol endpoints within each storage system of the pair of storage systems may include generating a pair of protocol endpoints for each host within each storage system of the pair of storage systems. The pair of storage systems may be synchronized storage systems configured to replicate the one or more virtual volumes on each storage system. Dedicating the one protocol endpoint of the pair of protocol endpoints to each storage system of the pair of storage systems may include assigning, for each virtual volume of the one or more virtual volumes, a storage system of the pair of storage systems for accessing the virtual volume during a connection failure between the pair of storage systems, thus defining a preferred storage system and a non-preferred storage system for each virtual volume. A connection failure between the pair of storage systems may be detected. In response to detecting the connection failure between the pair of storage systems, the one or more IO requests for the one or more virtual volumes may be processed via the protocol endpoint dedicated to the preferred storage system for each virtual volume. In response to detecting the connection failure between the pair of storage systems, access to the other protocol endpoint dedicated to the non-preferred storage system may be disabled for each virtual volume.

In another example implementation, a computing system includes at least one processor and at least one memory architecture coupled with the at least one processor, wherein the at least one processor is configured to generate a pair of protocol endpoints within each storage system of a pair of storage systems, wherein the at least one processor is configured to dedicate one protocol endpoint of the pair of protocol endpoints to each storage system of the pair of storage systems, and wherein the at least one processor is configured to process one or more IO requests between one or more hosts and one or more virtual volumes within the pair of storage systems via the pair of protocol endpoints.

One or more of the following example features may be included. Generating the pair of protocol endpoints within each storage system of the pair of storage systems may include generating a pair of protocol endpoints for each host within each storage system of the pair of storage systems. The pair of storage systems may be synchronized storage systems configured to replicate the one or more virtual volumes on each storage system. Dedicating the one protocol endpoint of the pair of protocol endpoints to each storage system of the pair of storage systems may include assigning, for each virtual volume of the one or more virtual volumes, a storage system of the pair of storage systems for accessing the virtual volume during a connection failure between the pair of storage systems, thus defining a preferred storage system and a non-preferred storage system for each virtual volume. A connection failure between the pair of storage systems may be detected. In response to detecting the connection failure between the pair of storage systems, the one or more IO requests for the one or more virtual volumes may be processed via the protocol endpoint dedicated to the preferred storage system for each virtual volume. In response to detecting the connection failure between the pair of storage systems, access to the other protocol endpoint dedicated to the non-preferred storage system may be disabled for each virtual volume.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
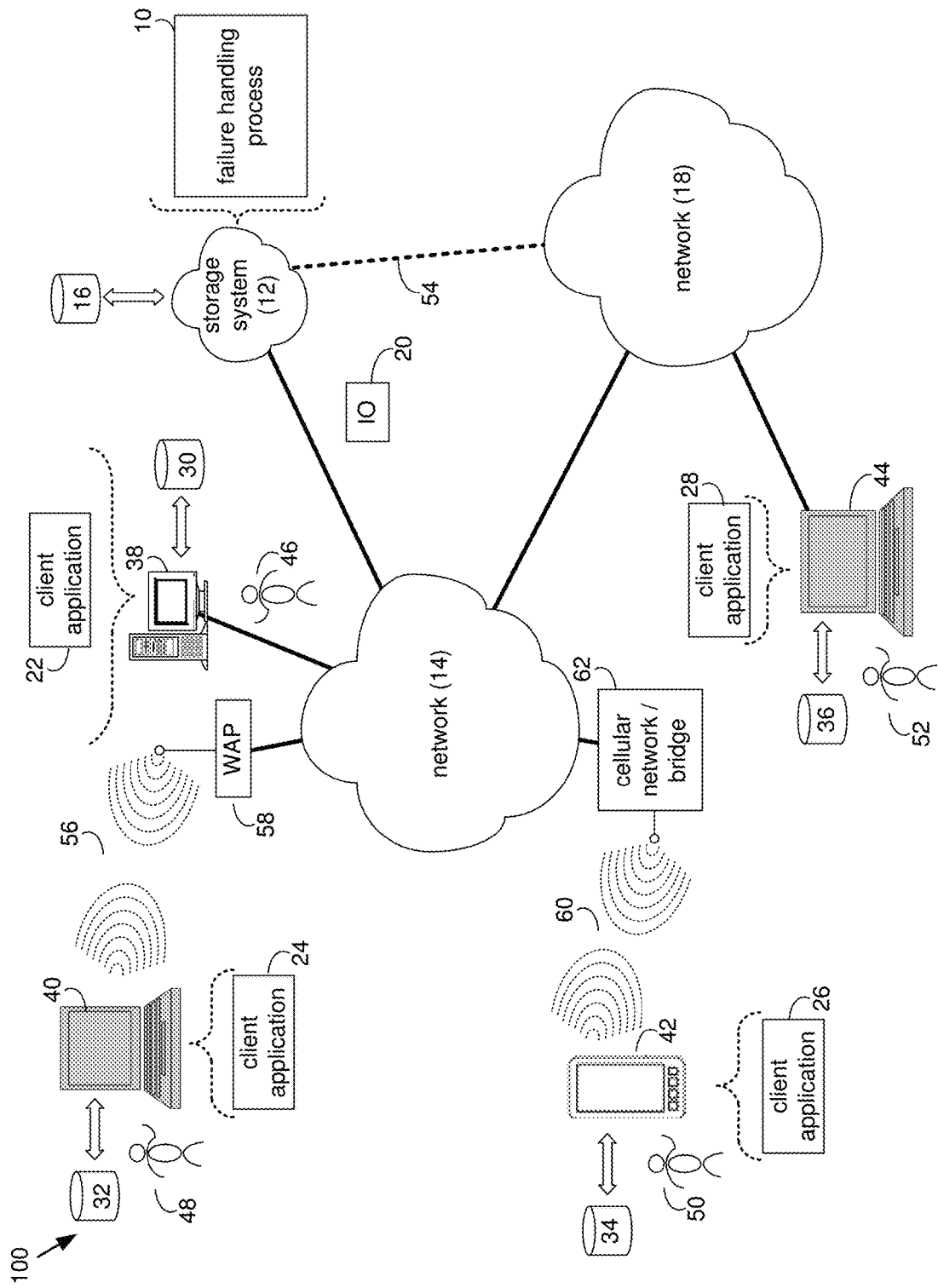
FIG. 1 is an example diagrammatic view of a storage system and a failure handling process coupled to a distributed computing network according to one or more example implementations of the disclosure.

System Overview:

Referring to FIG. 1, there is shown failure handling process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of failure handling process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of failure handling process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a failure handling process, such as failure handling process 10 of FIG. 1, may include but is not limited to, generating a pair of protocol endpoints within each storage system of a pair of storage systems. One protocol endpoint of the pair of protocol endpoints may be dedicated to each storage system of the pair of storage systems. One or more IO requests may be processed between one or more hosts and one or more virtual volumes within the pair of storage systems via the pair of protocol endpoints.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
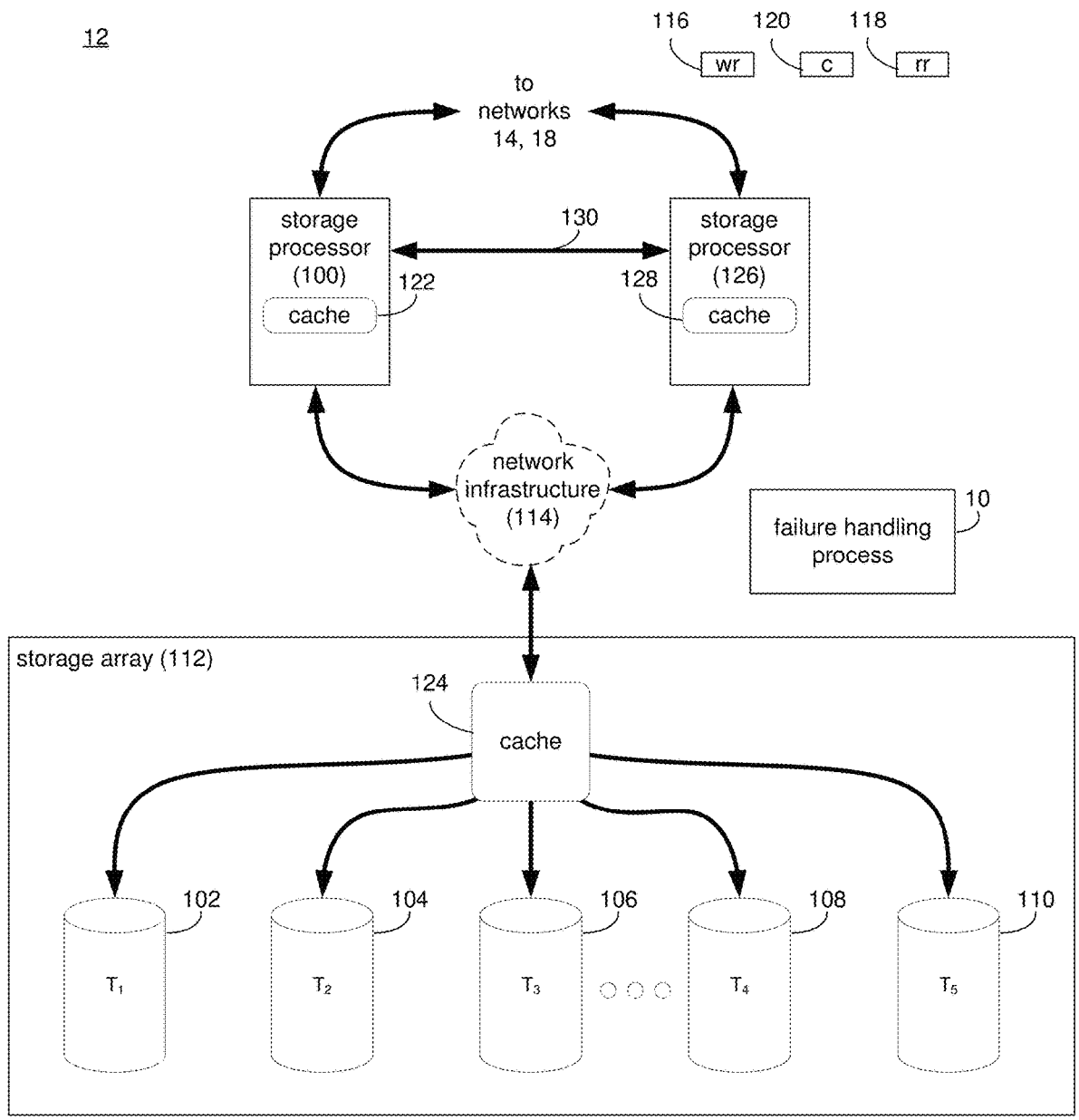
FIG. 2 is an example diagrammatic view of the storage system of FIG. 1 according to one or more example implementations of the disclosure.
Figure 3:
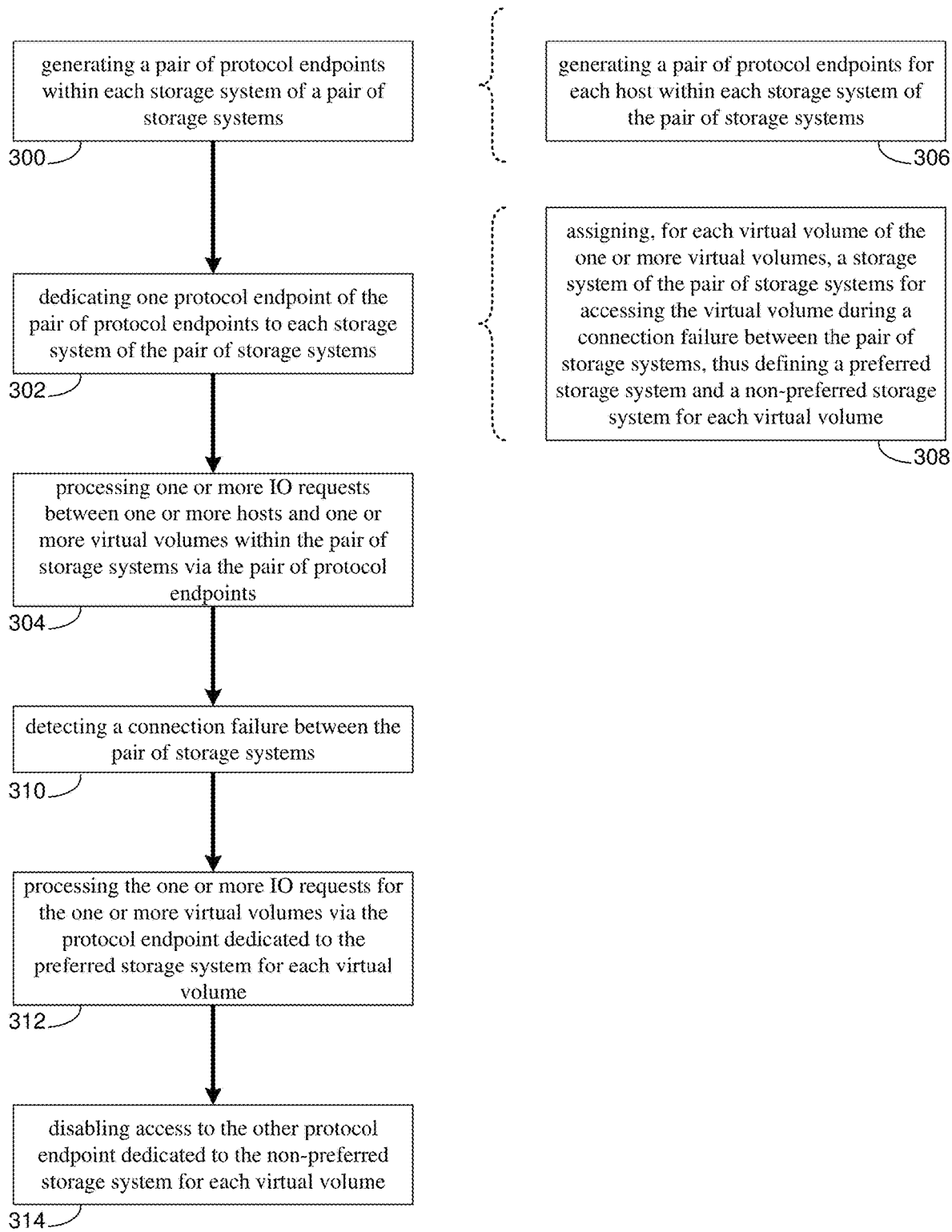
FIG. 3 is an example flowchart of the failure handling process of FIG. 1 according to one or more example implementations of the disclosure.
Figure 4:
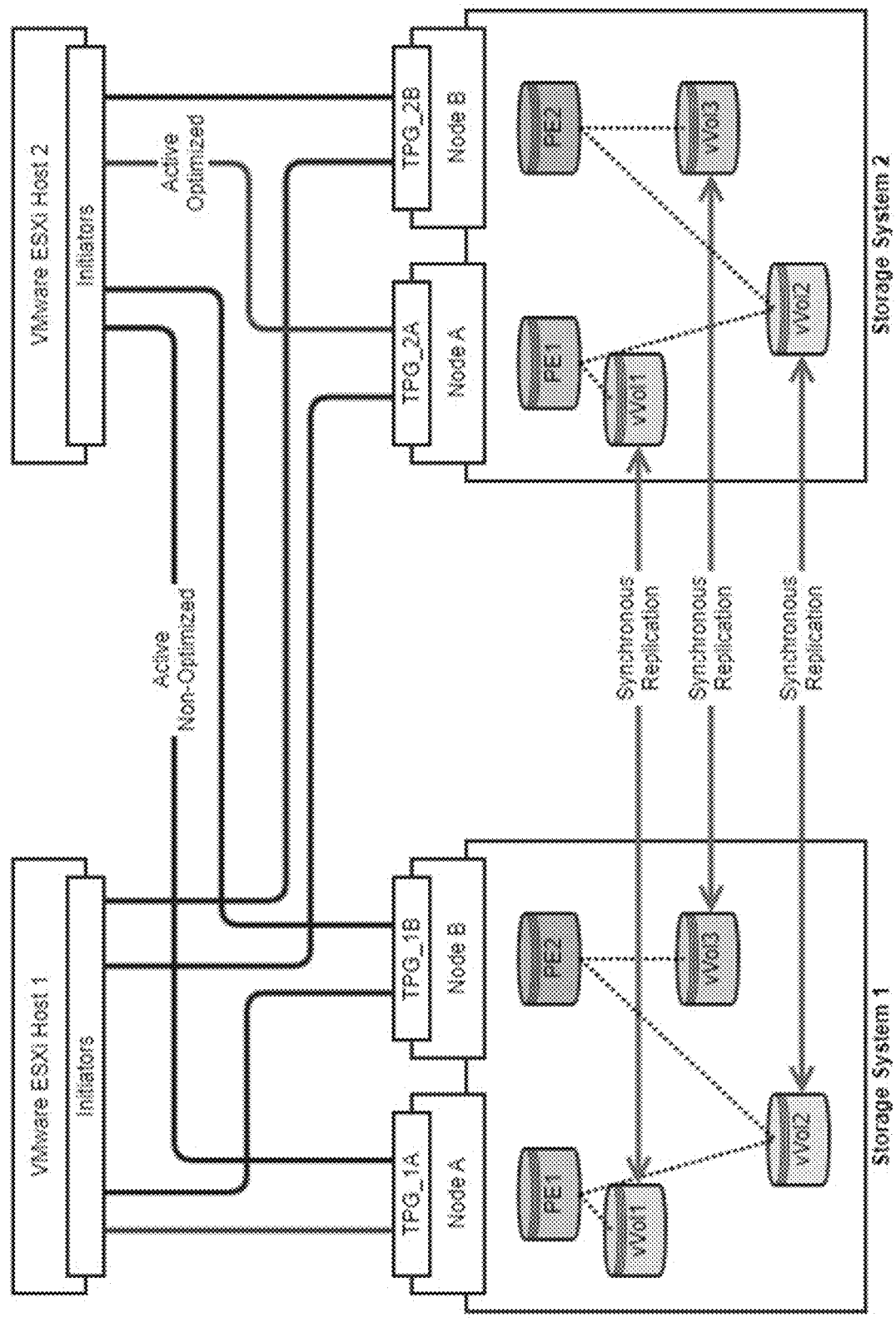
FIGS. 4-6 are example diagrammatic views o of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of failure handling process 10. The instruction sets and subroutines of failure handling process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of failure handling process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of failure handling process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of failure handling process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

The Failure Handling Process:

Referring also to FIGS. 3-6 and in some implementations, failure handling process 10 may generate 300 a pair of protocol endpoints within each storage system of a pair of storage systems. One protocol endpoint of the pair of protocol endpoints may be dedicated 302 to each storage system of the pair of storage systems. One or more IO requests may be processed 304 between one or more hosts and one or more virtual volumes within the pair of storage systems via the pair of protocol endpoints.

In some implementations, failure handling process 10 may allow for failure handling for virtual volumes deployed across multiple storage systems with minimal signaling overhead. For example and referring also to FIG. 4, pairs of storage systems, typically deployed in two different data centers or two server rooms within the same data center, may cooperate to expose a single "metro" virtual volume to application hosts, making those hosts and applications running on them perceive two virtual volumes hosted by the two storage systems as a single virtual volume. Such configurations may be referred to as a "metro cluster". Metro cluster configurations may generally be used for increased availability and disaster avoidance; resource balancing across datacenters; and storage migration. In some implementations, metro cluster configurations may be deployed using uniform host connectivity, where a host (e.g., a VMWare ESXi host) located in one datacenter is connected to both storage systems (with one connection across datacenters). As will be discussed in greater detail below, supporting uniform host connectivity for virtual volume-based metro cluster may involve "stretching" protocol endpoints across both storage systems, where the same protocol endpoint (e.g., an administrative LUN) is exposed by both storage systems as well as subordinate LUNs for bound "metro" virtual volumes.

However, various types of failures may occur between storage systems (e.g., storage array failure, datacenter failure, network connectivity failure, etc.). Failure of network connectivity between storage systems presents unique challenges from a failure handling perspective, as both storage systems may be operational and can potentially provide host access to virtual volumes. However, not being able to replicate to the peer storage system, each virtual volume can only stay online on one storage system. For example, various mechanisms may be employed to decide which storage system hosts a virtual volume during network connection failure. Examples include, but are not limited to, a predefined storage system preference that indicates, for a particular virtual volume or for multiple virtual volumes, which storage array is preferred to use for accessing the virtual volumes; and a third party witness deployed in a separate failure domain that helps decide which storage system to use for accessing a particular virtual volume or for multiple virtual volumes.

Referring again to FIG. 4 and in some implementations, suppose that there is a network connectivity failure between Storage System 1 and Storage System 2. In this example virtual volume "vVol1" may stay online on Storage System 1 and virtual volumes "vVol2" and "vVol3" may stay online on Storage System 2. In this example, both vVol1 and vVol2 are bound to a "metro" protocol endpoint "PE1." However under this failure condition, any input-output (IO) request targeted to vVol1 on Storage System 2 and any IO request targeted to vVol2 on Storage System 1 will fail as these virtual volumes are offline on those storage systems. Therefore, protocol endpoints no longer function as they are intended and hosts accessing the virtual volumes will need to maintain information on virtual volume availability over certain paths, which may lead to scaling issues in hypervisor IO handling logic.

As will be discussed in greater detail below, failure handling process 10 may address the above challenges by generating protocol endpoints for uniform connected hosts in matching pairs or sets (i.e., one protocol endpoint dedicated to each storage system). Once a failure is detected, each protocol endpoint out of the pair or set will keep paths active on just one storage system and virtual volumes bound to the protocol endpoint will be kept online on that storage system, making sure each protocol endpoint is still a path management unit. Additionally, failure handling process 10 may switch certain paths on the other storage system to be unavailable.

In some implementations, failure handling process 10 may generate 300 a pair of protocol endpoints within each storage system of a pair of storage systems. A protocol endpoint may generally include an access point from a host to a storage system. In some implementations and referring also to FIG. 5, multiple hosts (e.g., hosts 500, 502) may be configured to generate and/or process 10 requests for data within a pair of storage systems (e.g., storage systems 12, 504). In some implementations, hosts 500, 502 may be servers/data storage devices on which a hypervisor or multiple hypervisors are installed. As is known in the art, a hypervisor is a piece of computer software, firmware or hardware that creates and runs virtual machines. The hypervisor may present a guest operating system with a virtual operating platform and may manage the execution of the guest operating system. Additionally, multiple instantiations of a variety of operating systems may share virtualized hardware resources. For example, Linux™, Windows™, and Mac instantiations may all run on a single physical system. As is known in the art, a virtual machine is an emulation of a physical computer system. A virtual machine may be based on physical computer architecture and may provide the functionality of a physical computer system. Accordingly, the use of hypervisors such as VMWare ESXi® to create virtual machines is highly efficient, as each host device (e.g., hosts 500, 502) can support multiple virtual machines. In some implementations, the virtual machines may be configured to interact with virtual volumes stored in storage systems 12, 504. As is known in the art, a virtual volume may generally include a virtual storage object configured to store data and/or a reference to data generated by a virtual machine (e.g., virtual machine files, virtual disks, etc.).

However, when processing input-output (IO) requests from a virtual machine to a virtual volume, hosts 500, 502 do not have direct access to virtual volumes. As such, a protocol endpoint may be generated to provide a data path from a virtual machine to a respective virtual volume. For example and as will be discussed in greater detail below, each virtual volume may be bound to a protocol endpoint. When a virtual machine on the host performs an IO operation, the protocol endpoint may direct the IO request to the appropriate virtual volume. In some implementations, a single protocol endpoint can connect hundreds or thousands of virtual volumes. In some implementations, the protocol endpoint may manage or direct IO received from a virtual machine enabling scaling across many virtual volumes leveraging multi-pathing of the protocol endpoint.

In some implementations and referring again to FIG. 5, suppose hosts 500, 502 are communicatively coupled to storage systems 12, 504. In this example, hosts 500, 502 may be coupled to storage systems 12, 504 via a plurality of paths (e.g., Asymmetric Logical Unit Access (ALUA) paths). As is known in the art, ALUA is a set of SCSI concepts and commands that define path prioritization for SCSI devices. ALUA is a formalized way to describe SCSI port status, and access characteristics. For example, an ALUA path may include a path to a particular logical unit number (LUN). As is known in the art, each ALUA path may be defined with various states (e.g., Active/Optimized; Active/Non-Optimized; Unavailable; and Transitioning).

In some implementations and as discussed above, failure handling process 10 may generate 300 a pair of protocol endpoints within each storage system of a pair of storage systems. In this example, each protocol endpoint may be an administrative LUN configured to provide access between a host and a virtual volume within a storage system. Accordingly, failure handling process 10 may define each path between hosts 500, 502 and storage systems 12, 504 as an ALUA path between hosts 500, 502 and protocol endpoints within each storage system.

For example and as discussed above, failure handling process 10 may generate 300 a pair of protocol endpoints (e.g., protocol endpoint pair 506 with protocol endpoints 508, 510) within storage system 12 and a pair of protocol endpoints (e.g., protocol endpoint pair 512 with protocol endpoints 514, 516) within storage system 504. As will be discussed in greater detail below, protocol endpoint pair 512 may be synchronized with protocol endpoint pair 506 such that protocol endpoints 508 and 514 are identical and that protocol endpoints 510 and 516 are identical. In some implementations, failure handling process 10 may define path 518 between host 500 and protocol endpoint 508 (e.g., via storage processor 100); path 520 between host 500 and protocol endpoint 514 (e.g., via storage processor 522); path 524 between host 500 and protocol endpoint 510 (e.g., via storage processor 126); and path 526 between host 500 and protocol endpoint 516 (e.g., via storage processor 528). While an example with e.g., four paths defined between two hosts and two protocol endpoints across two storage systems has been described, it will be appreciated that any number of paths between hosts 500, 502 and storage systems 12, 504 may be defined within the scope of the present disclosure.

Figure 5:
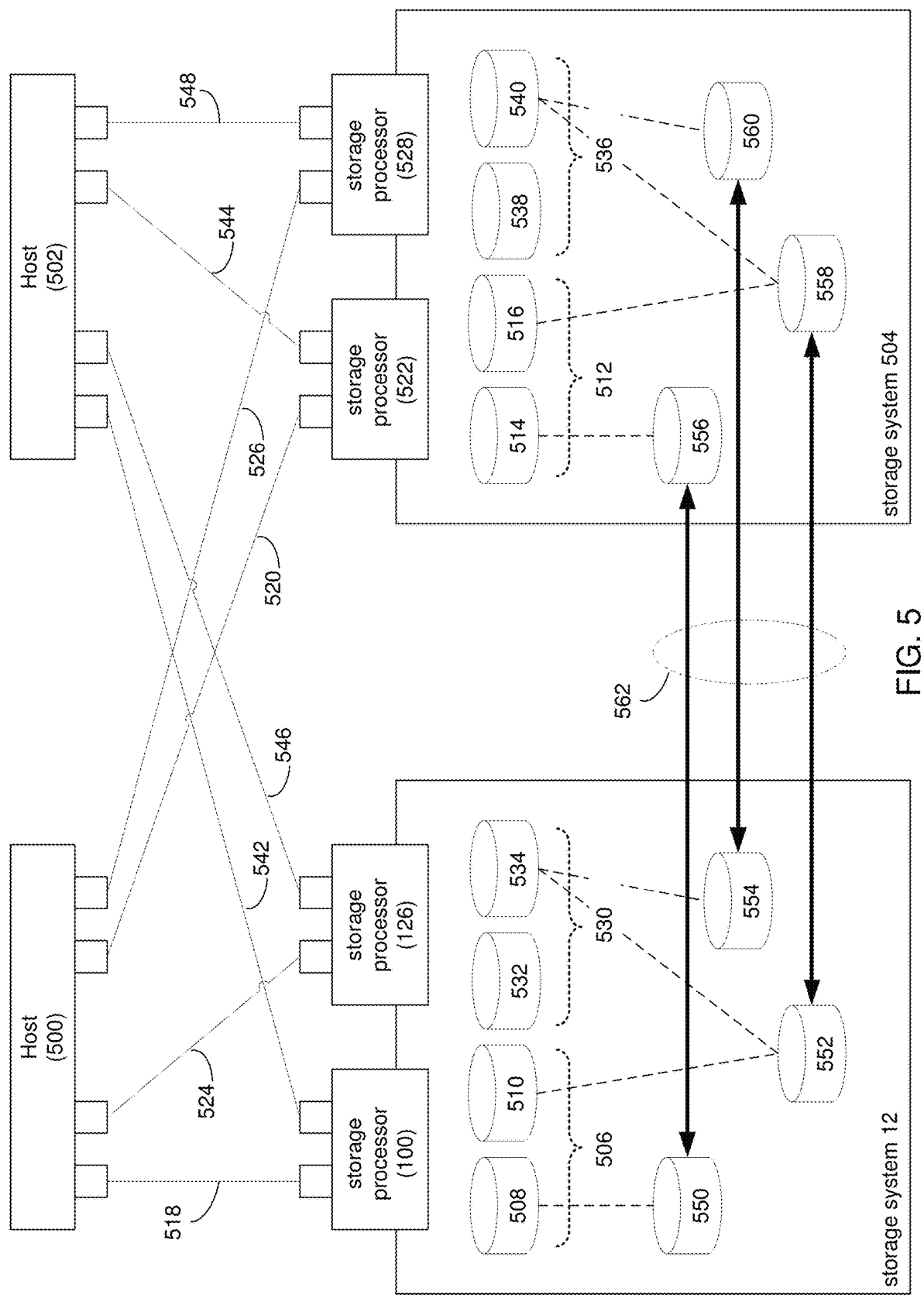

In some implementations, the pair of storage systems may be synchronized storage systems configured to replicate the one or more virtual volumes on each storage system. Referring again to FIG. 5 and in some implementations, storage system 12 and storage system 504 may be configured in an active/active relationship where data on one storage system is replicated and synchronized with the other storage system. In this manner, data provided to and/or stored within one storage system may be available on both storage systems. Accordingly, storage system 12 and storage system 504 may be synchronized storage systems. As shown in FIG. 5, protocol endpoint pair 506 with protocol endpoints 508, 510 may be replicated on storage system 504 as protocol endpoint pair 512 with protocol endpoints 514, 516.

In some implementations, generating 300 the pair of protocol endpoints within each storage system of the pair of storage systems may include generating 306 a pair of protocol endpoints for each host within each storage system of the pair of storage systems. For example and in some implementations, a pair of protocol endpoints (e.g., protocol endpoint pair 506 with protocol endpoints 508, 510) may be shared by multiple hosts (e.g., hosts 500, 502) and where both storage systems (e.g., storage systems 12, 504) expose Active/Optimized ALUA paths to the same pair of protocol endpoints (e.g., protocol endpoint pair 506 with protocol endpoints 508, 510). However and in some implementations, if the storage system architecture requires creating a protocol endpoint per connected host, failure handling process 10 may generate 306 a pair of protocol endpoints for each host within each storage system of the pair of storage systems.

As shown in the example of FIG. 5, failure handling process 10 may generate a pair of protocol endpoints (e.g., protocol endpoint pair 506 with protocol endpoints 508, 510 on storage system 12 for host 500; protocol endpoint pair 512 with protocol endpoints 514, 516 on storage system 504 for host 500; protocol endpoint pair 530 with protocol endpoints 532, 534 on storage system 12 for host 502; and protocol endpoint pair 536 with protocol endpoints 538, 540 on storage system 504 for host 502). Accordingly, failure handling process 10 may generate or define path 542 between host 502 and protocol endpoint 532 (e.g., via storage processor 100); path 544 between host 502 and protocol endpoint 538 (e.g., via storage processor 522); path 546 between host 502 and protocol endpoint 534 (e.g., via storage processor 126); and path 548 between host 502 and protocol endpoint 540 (e.g., via storage processor 528). While an example with e.g., four paths defined between two hosts and four protocol endpoints across two storage systems has been described, it will be appreciated that any number of paths between hosts 500, 502 and storage systems 12, 504 may be defined within the scope of the present disclosure.

In some implementations, failure handling process 10 may dedicate 302 one protocol endpoint of the pair of protocol endpoints to each storage system of the pair of storage systems. Dedicating a protocol endpoint to a storage system may generally include designating a protocol endpoint to bind virtual volumes preferred or assigned to the storage system. In some implementations, failure handling process 10 may perform default dedication of protocol endpoints to particular storage systems and/or may receive a user-selection of a particular protocol endpoint to dedicate to a specific storage system. As will be discussed in greater detail below and during a failure condition, the protocol endpoint dedicated to a particular storage system will remain online on the storage system preferred for a particular virtual volume.

For example, failure handling process 10 may dedicate 302 protocol endpoint 508 of protocol endpoint pair 506/protocol endpoint 514 of protocol endpoint pair 512 to storage system 12 and protocol endpoint 510 of protocol endpoint pair 506/protocol endpoint 516 of protocol endpoint pair 512 to storage system 504 for host 500. As discussed above, protocol endpoint pairs 506 and 512 and protocol endpoint pairs 530 and 536 may be replicas of one another on each storage system. Similarly and as discussed above for a pair of endpoints generated 306 for each host, failure handling process 10 may dedicate 302 protocol endpoint 532 of the protocol endpoint pair 530/protocol endpoint 538 of protocol endpoint pair 536 to storage system 12 and protocol endpoint 534 of protocol endpoint pair 530/protocol endpoint 540 of protocol endpoint pair 536 to storage system 504, for host 502. However, while failure handling process 10 may dedicate 302 each protocol endpoint from the pair of protocol endpoints to a specific storage system, failure handling process 10 may utilize both protocol endpoints during normal operation of the synchronized storage systems. In this manner, under normal conditions, each protocol endpoint of the pair of protocol endpoints may be exposed by both storage systems.

In some implementations, dedicating 302 the one protocol endpoint of the pair of protocol endpoints to each storage system of the pair of storage systems may include assigning 308, for each virtual volume of the one or more virtual volumes, a storage system of the pair of storage systems for accessing the virtual volume during a connection failure between the pair of storage systems, thus defining a preferred storage system and a non-preferred storage system for each virtual volume. For example, when generating a virtual volume (or at any other time during the operation of a virtual volume), failure handling process 10 may assign 308 or bind a virtual volume to a particular storage system for access if the connection between the synchronized storage systems fails.

In some implementations, when assigning 308 a virtual volume to a particular storage system, failure handling process 10 may provide a user interface for receiving a selection, for a specific virtual volume or multiple virtual volumes, of a storage system to use to access the virtual volume during a connection failure between the synchronized storage systems. In some implementations, failure handling process 10 may assign 308 each virtual volume to a default storage system absent a particular selection. In this manner, failure handling process 10 may define a preferred storage system (i.e., the storage system to provide access to the virtual volume during a connection failure between the synchronized storage systems) and a non-preferred storage system (i.e., the other storage system that will not provide access to the virtual volume during a connection failure between the synchronized storage systems).

Referring again to FIG. 5, suppose failure handling process 10 assigns 308 storage system 12 to be the preferred storage system for virtual volume 550, storage system 504 to be the preferred storage system for virtual volume 552; and storage system 504 to be the preferred storage system for virtual volume 554. In this example, storage system 504 may be the non-preferred storage system for virtual volume 550 and storage system 12 may be the non-preferred storage system for virtual volumes 552, 554. As discussed above and in some implementations, failure handling process 10 may replicate virtual volumes 550, 552, 554 as identical virtual volumes 556, 558, 560, respectively on storage system 504 (e.g., represented in FIG. 5 with arrows 562). In this manner, an identical copy of virtual volume 550 within storage system 12 may be provided within storage system 504 as virtual volume 556; an identical copy of virtual volume 552 within storage system 12 may be provided within storage system 504 as virtual volume 558; and an identical copy of virtual volume 554 within storage system 12 may be provided within storage system 504 as virtual volume 560. While an example with e.g., three virtual volumes has been described, it will be appreciated that any number of virtual volumes may be used within the scope of the present disclosure.

In some implementations, failure handling process 10 may modify the assignment of the storage system preference for a virtual volume if both storage systems are online. For example, when a storage administrator changes the storage system preference for an assigned or bound virtual volume (e.g., virtual volumes 550, 552, 554), storage systems (e.g., storage systems 12, 504) may send a rebind event to the hosts (e.g., hosts 500, 502) binding the virtual volume. The hosts (e.g., hosts 500, 502) may then request a new assignment or binding for the virtual volumes and the storage systems may assign or bind the virtual volume to a corresponding protocol endpoint (i.e., the protocol endpoint dedicated 302 to the particular storage system).

In some implementations and as shown in FIG. 5, because protocol endpoint 508 is dedicated for storage system 12 and storage system 12 is assigned as the preferred storage system for virtual volume 550, failure handling process 10 may bind virtual volume 550 to protocol endpoint 508. As protocol endpoint 514 is identical to protocol endpoint 508, failure handling process 10 may bind virtual volume 556 (e.g., identical to volume 550) to protocol endpoint 514. Similarly, because protocol endpoint 516 is dedicated for storage system 504 and storage system 504 is assigned as the preferred storage system for virtual volume 558, failure handling process 10 may bind virtual volume 558 to protocol endpoint 516. As protocol endpoint 510 is identical to protocol endpoint 516, failure handling process 10 may bind virtual volume 552 (e.g., identical to volume 558) to protocol endpoint 510. Additionally, failure handling process 10 may bind virtual volumes 558 and 560 to protocol endpoint 540. As protocol endpoint 534 is identical to protocol endpoint 540, failure handling process 10 may bind virtual volumes 552 and 554 to protocol endpoint 534. As shown in FIG. 5, the binding of virtual volumes to protocol endpoints is represented in dashed lines between each virtual volume and the respective protocol endpoints in storage system 12 and storage system 504.

In some implementations, failure handling process 10 may process 304 one or more IO requests between one or more hosts and one or more virtual volumes within the pair of storage systems via the pair of protocol endpoints. For example, failure handling process 10 may utilize both protocol endpoints (e.g., the paths between the hosts and the protocol endpoints) of each pair of protocol endpoints during normal operation of the synchronized storage systems. In this manner, under normal conditions, each protocol endpoint of the pair of protocol endpoints may be exposed by both storage systems and utilized by the one or more hosts for processing 304 one or more IO requests to one or more virtual volumes within the pair of storage systems.

Figure 6:
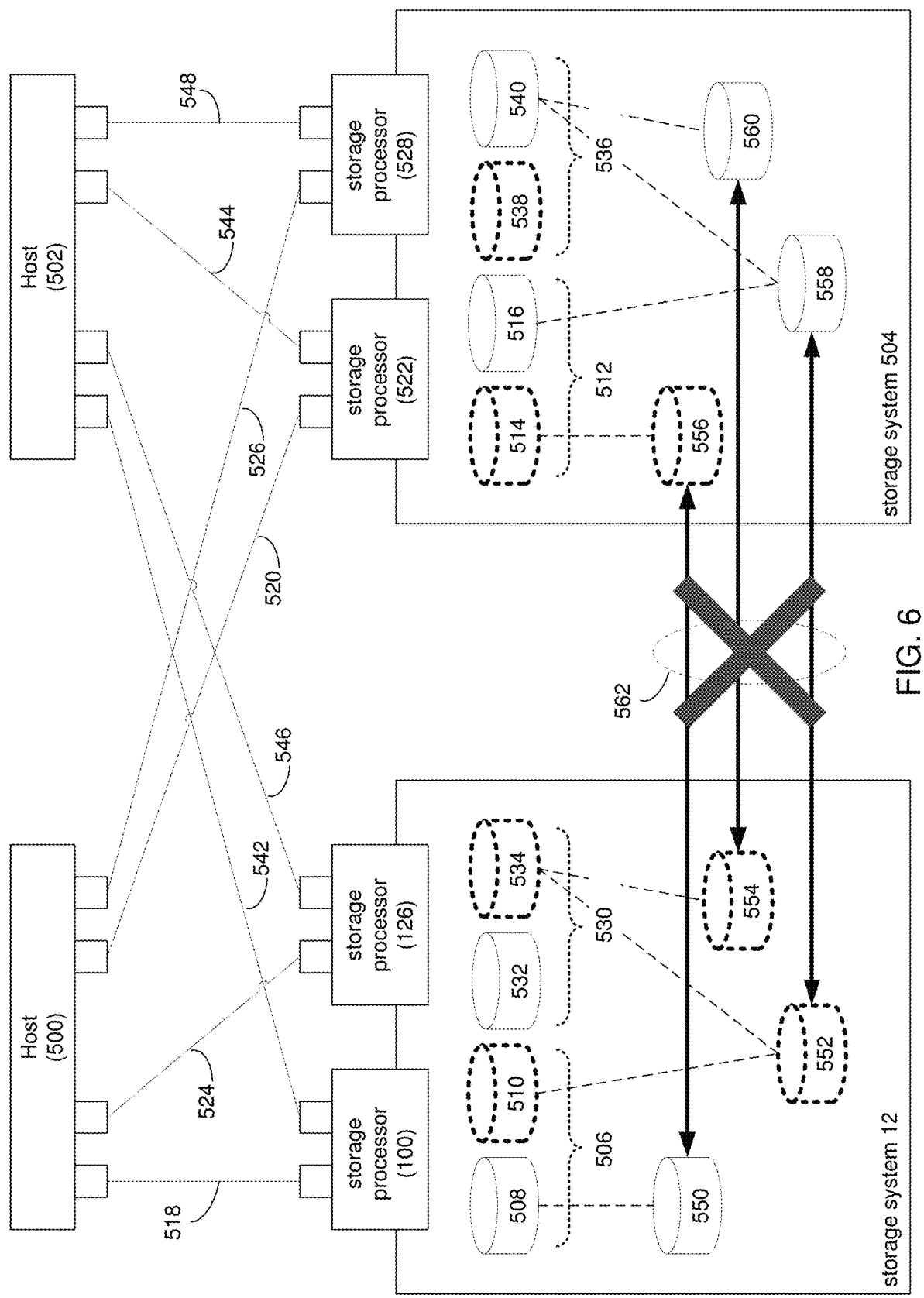

In some implementations, failure handling process 10 may detect 310 a connection failure between the pair of storage systems. Referring also to FIG. 6 and in some implementations, a connection failure between storage system 12 and storage system 504 may be detected 310 (e.g., in response to a predefined period of time without communication or returned pings from the other storage system, a component within either storage system indicating failure of a hardware or software component configured to couple storage system 12 and storage system 504, etc.). In some implementations, during the connection failure, while storage system 12 and storage system 504 may be unable to communicate with one another, each storage system may still be accessible to the one or more hosts (e.g., hosts 500, 502). As shown in the example of FIG. 6, the connection failure between storage system 12 and storage system 504 may be represented by an "X" over arrows 562 representing synchronized replication of data between replicated virtual volumes 550, 552, 554 within each storage system.

In some implementations and as discussed above, a third party witness may be deployed in a separate failure domain that helps decide which storage system to use for accessing a particular virtual volume or for multiple virtual volumes. For example and as is known in the art, the third party witness may include a hardware and/or software module configured to override storage system preferences for a storage system to promote for particular virtual volumes in the presence of additional failures. Accordingly, the designation of the preferred storage system and the non-preferred storage system may be re-defined or re-assigned 308 by the third party witness. In this manner, reference to the preferred storage system may include the storage system decided by the third party witness. For example, a third party witness may re-assign 308, for each virtual volume of the one or more virtual volumes, a storage system of the pair of storage systems for accessing the virtual volume during a connection failure between the pair of storage systems, thus defining the preferred storage system and the non-preferred storage system for each virtual volume.

In some implementations and in response to detecting 310 the connection failure between the pair of storage systems, failure handling process 10 may process 312 the one or more IO requests for the one or more virtual volumes via the protocol endpoint dedicated to the preferred storage system for each virtual volume. For example, when network connectivity between the storage systems fails, only the protocol endpoint dedicated to a particular storage system may stay online on that storage system. Referring again to FIG. 6, failure handling process 10 may keep the ALUA paths to protocol endpoints for a preferred storage system as Active/Optimized and may switch the ALUA paths to protocol endpoints for a non-preferred storage system to Unavailable. Accordingly, all virtual volumes bound to a particular protocol endpoint may be available for processing IO requests on the preferred storage system. Accordingly, failure handling process 10 may process 312 the one or more IO requests for the one or more virtual volumes via the protocol endpoint dedicated to the preferred storage system for each virtual volume using the Active/Optimized ALUA paths between the one or more hosts and the protocol endpoint dedicated to the preferred storage system for each virtual volume.

In some implementations and in response to detecting the connection failure between the pair of storage systems, failure handling process 10 may disable 314 access to the other protocol endpoint dedicated to the non-preferred storage system for each virtual volume. For example and as discussed above, failure handling process 10 may disable 314 access to the protocol endpoint dedicated to the non-preferred storage system by switching the ALUA path to the protocol endpoints for a non-preferred storage system to Unavailable.

Referring again to FIG. 6, suppose failure handling process 10 dedicates 302 protocol endpoint 508 to storage system 12 for host 500; protocol endpoint 532 to storage system 12 for host 502; protocol endpoint 516 to storage system 504 for host 500; and protocol endpoint 538 to storage system 504 for host 502. Further suppose that failure handling process 10 assigns 308 storage system 12 as the preferred storage system for virtual volume 550 and storage system 504 as the preferred storage system for virtual volumes 558, 560. In this example, failure handling process 10 may disable 314 access to protocol endpoints 510 and 534 on storage system 12 by switching the ALUA paths to protocol endpoints 510 and 534 to Unavailable (e.g., represented in FIG. 6 with protocol endpoints 510 and 534 rendered in dotted lines). Failure handling process 10 may also disable 314 access to protocol endpoints 514 and 538 on storage system 504 by switching the ALUA paths to protocol endpoints 514 and 538 to Unavailable (e.g., represented in FIG. 6 with protocol endpoints 514 and 538 being rendered in dotted lines). In this manner, access to virtual volumes 552, 554 on storage system 12 may be disabled and access to virtual volume 556 on storage system 504 may be disabled.

Continuing with the above example and while a connection failure exists between storage system 12 and storage system 504, failure handling process 10 may process 314 the one or more IO requests for the one or more virtual volumes via the protocol endpoint dedicated to the preferred storage system for each virtual volume using the Active/Optimized ALUA paths between the one or more hosts and the protocol endpoint dedicated to the preferred storage system for each virtual volume. In this example, failure handling process 10 may process 314 IO requests for virtual volume 550 via protocol endpoint 508 and IO requests for virtual volumes 558, 560 via protocol endpoints 516, 540.

In some implementations, failure handling process 10 may detect a site or storage system failure as opposed to a connection failure where one storage system is offline (e.g., a power failure or other type of failure). In this example, failure handling process 10 may, in response to detecting a storage system failure, disable access to the protocol endpoints and virtual volumes offline on the non-preferred storage system as discussed above.

In some implementations, failure handling process 10 may determine when the connection failure is resolved. Failure handling process 10 may resume replication of virtual volumes 550, 552, 554 across storage system 12 and storage system 504. In some implementations, failure handling process 10 may enable access to protocol endpoints 510 and 532 on storage system 12 by switching the respective ALUA paths to Active/Optimized and may also enable access to protocol endpoints 514, 538 on storage system 504 by switching the respective ALUA paths to Active/Optimized. In this manner, access to virtual volumes 550, 552, 554 on each storage system may be re-enabled when the connection failure is resolved.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    generating a pair of protocol endpoints within each storage system of a pair of storage systems;
    dedicating one protocol endpoint of the pair of protocol endpoints to each storage system of the pair of storage systems; and
    processing one or more IO requests between one or more hosts and one or more virtual volumes within the pair of storage systems via the pair of protocol endpoints,
    wherein dedicating the one protocol endpoint of the pair of protocol endpoints to each storage system of the pair of storage systems includes assigning, for each virtual volume of the one or more virtual volumes, a storage system of the pair of storage systems for accessing the virtual volume during a connection failure between the pair of storage systems.

2. The computer-implemented method of claim 1, wherein generating the pair of protocol endpoints within each storage system of the pair of storage systems includes generating a pair of protocol endpoints for each host within each storage system of the pair of storage systems.

3. The computer-implemented method of claim 1, wherein the pair of storage systems are synchronized storage systems configured to replicate the one or more virtual volumes on each storage system.

4. The computer-implemented method of claim 1, wherein dedicating the one protocol endpoint of the pair of protocol endpoints to each storage system of the pair of storage systems includes defining a preferred storage system and a non-preferred storage system for each virtual volume.

5. The computer-implemented method of claim 1, further comprising:
    detecting a connection failure between the pair of storage systems.

6. The computer-implemented method of claim 4, further comprising:
in response to detecting the connection failure between the pair of storage systems, processing the one or more IO requests for the one or more virtual volumes via the protocol endpoint dedicated to the preferred storage system for each virtual volume.

7. The computer-implemented method of claim 4, further comprising:
in response to detecting the connection failure between the pair of storage systems, disabling access to the other protocol endpoint dedicated to the non-preferred storage system for each virtual volume.

8. A computer program product residing on a non-transitory computer readable medium having a plurality of instructions stored thereon which, when executed by a processor, cause the processor to perform operations comprising:
generating a pair of protocol endpoints within each storage system of a pair of storage systems;
dedicating one protocol endpoint of the pair of protocol endpoints to each storage system of the pair of storage systems; and
processing one or more IO requests between one or more hosts and one or more virtual volumes within the pair of storage systems via the pair of protocol endpoints,
wherein dedicating the one protocol endpoint of the pair of protocol endpoints to each storage system of the pair of storage systems includes assigning, for each virtual volume of the one or more virtual volumes, a storage system of the pair of storage systems for accessing the virtual volume during a connection failure between the pair of storage systems.

9. The computer program product of claim 8, wherein generating the pair of protocol endpoints within each storage system of the pair of storage systems includes generating a pair of protocol endpoints for each host within each storage system of the pair of storage systems.

10. The computer program product of claim 8, wherein the pair of storage systems are synchronized storage systems configured to replicate the one or more virtual volumes on each storage system.

11. The computer program product of claim 8, wherein dedicating the one protocol endpoint of the pair of protocol endpoints to each storage system of the pair of storage systems includes defining a preferred storage system and a non-preferred storage system for each virtual volume.

12. The computer program product of claim 8, wherein the operations further comprise:
detecting a connection failure between the pair of storage systems.

13. The computer program product of claim 11, wherein the operations further comprise:
in response to detecting the connection failure between the pair of storage systems, processing the one or more IO requests for the one or more virtual volumes via the protocol endpoint dedicated to the preferred storage system for each virtual volume.

14. The computer program product of claim 11, wherein the operations further comprise:
in response to detecting the connection failure between the pair of storage systems, disabling access to the other protocol endpoint dedicated to the non-preferred storage system for each virtual volume.

15. A computing system comprising:
a memory; and
a processor configured to generate a pair of protocol endpoints within each storage system of a pair of storage systems, wherein the processor is further configured to dedicate one protocol endpoint of the pair of protocol endpoints to each storage system of the pair of storage systems, wherein the processor is further configured to process one or more IO requests between one or more hosts and one or more virtual volumes within the pair of storage systems via the pair of protocol endpoints, and wherein the processor is further configured to assign, for each virtual volume of the one or more virtual volumes, a storage system of the pair of storage systems for accessing the virtual volume during a connection failure between the pair of storage systems.

16. The computing system of claim 15, wherein generating the pair of protocol endpoints within each storage system of the pair of storage systems includes generating a pair of protocol endpoints for each host within each storage system of the pair of storage systems.

17. The computing system of claim 15, wherein the pair of storage systems are synchronized storage systems configured to replicate the one or more virtual volumes on each storage system.

18. The computing system of claim 15, wherein dedicating the one protocol endpoint of the pair of protocol endpoints to each storage system of the pair of storage systems includes defining a preferred storage system and a non-preferred storage system for each virtual volume.

19. The computing system of claim 15, wherein the processor is further configured to:
detect a connection failure between the pair of storage systems.

20. The computing system of claim 18, wherein the processor is further configured to:
in response to detecting the connection failure between the pair of storage systems, process the one or more IO requests for the one or more virtual volumes via the protocol endpoint dedicated to the preferred storage system for each virtual volume.

\* \* \* \* \*